(12) United States Patent
Sarcar

(10) Patent No.: US 8,880,732 B1
(45) Date of Patent: Nov. 4, 2014

(54) METHOD AND SYSTEM FOR APPLICATION ISOLATION

(75) Inventor: Kanoj Sarcar, Fremont, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 535 days.

(21) Appl. No.: 13/035,114

(22) Filed: Feb. 25, 2011

(51) Int. Cl.
  *H04L 29/12* (2006.01)
  *G06F 17/30* (2006.01)
  *H04M 3/42* (2006.01)
  *G06F 15/16* (2006.01)

(52) U.S. Cl.
  CPC ...... *G06F 17/30876* (2013.01); *H04L 61/1582* (2013.01); *H04L 61/30* (2013.01); *H04L 29/12594* (2013.01); *H04M 3/42119* (2013.01); *G06F 15/16* (2013.01); *H04M 3/42076* (2013.01)
  USPC ........... 709/245; 707/796; 707/802; 707/803; 707/811; 707/812; 707/830; 707/831

(58) Field of Classification Search
  CPC ..................... H04L 29/12066; H04L 61/1511; H04L 61/1582; H04L 61/30
  USPC .......... 709/245; 707/796, 802, 803, 811, 812, 707/830, 831
  See application file for complete search history.

(56) References Cited

U.S. PATENT DOCUMENTS

| | | | | |
|---|---|---|---|---|
| 4,168,469 A | * | 9/1979 | Parikh et al. .................. | 375/365 |
| 5,724,510 A | * | 3/1998 | Arndt et al. ................... | 709/220 |
| 6,073,178 A | * | 6/2000 | Wong et al. ................... | 709/229 |
| 6,178,505 B1 | * | 1/2001 | Schneider et al. ............ | 713/168 |
| 6,317,754 B1 | * | 11/2001 | Peng .............................. | 707/610 |
| 6,457,053 B1 | * | 9/2002 | Satagopan et al. ............ | 709/226 |
| 6,678,283 B1 | * | 1/2004 | Teplitsky ....................... | 370/463 |
| 6,735,619 B1 | * | 5/2004 | Sawada .......................... | 709/212 |
| 6,757,746 B2 | * | 6/2004 | Boucher et al. ............... | 709/250 |
| 6,785,728 B1 | * | 8/2004 | Schneider et al. ............ | 709/229 |
| 6,804,700 B1 | * | 10/2004 | Terek et al. ................... | 709/203 |
| 6,920,485 B2 | * | 7/2005 | Russell .......................... | 709/214 |
| 6,965,988 B1 | * | 11/2005 | Hansmann et al. ............... | 713/1 |
| 7,260,648 B2 | * | 8/2007 | Tingley et al. ................ | 709/245 |
| 7,409,472 B2 | * | 8/2008 | Iwatani et al. .................. | 710/36 |
| 7,603,130 B2 | * | 10/2009 | Anantha ..................... | 455/456.3 |
| 7,865,752 B2 | * | 1/2011 | Brabenac ....................... | 713/323 |
| 8,019,837 B2 | * | 9/2011 | Kannan et al. ................ | 709/220 |
| 8,068,503 B2 | * | 11/2011 | Desai et al. ................... | 370/400 |
| 8,089,896 B2 | * | 1/2012 | Tokunaga et al. ............. | 370/252 |
| 8,095,577 B1 | * | 1/2012 | Faibish et al. ................. | 707/823 |

(Continued)

FOREIGN PATENT DOCUMENTS

EP    2381652 A2 * 10/2011

*Primary Examiner* — O. C. Vostal

(74) *Attorney, Agent, or Firm* — Klein, O'Neill & Singh, LLP

(57) ABSTRACT

Method and system for application isolation is provided. A computing system executes a plurality of processor executable applications and each application is assigned an address by an adapter that is operationally coupled to the computing system. The adapter also assigns a unique identifier to each construct generated by the plurality of applications; maintains a data structure associating the address with the unique identifier assigned to each construct; receives a request having an address and a unique identifier from an application from among the plurality of applications; retrieves the address and the unique identifier from the request; compares the retrieved address and the unique identifier with information maintained by the data structure; and processes the request if the retrieved address and the unique identifier matches with information of the data structure.

20 Claims, 5 Drawing Sheets

(56) References Cited

U.S. PATENT DOCUMENTS

| | | | |
|---|---|---|---|
| 8,166,175 B2* | 4/2012 | Schmieder et al. | 709/227 |
| 8,171,295 B2* | 5/2012 | Munetoh et al. | 713/176 |
| 8,271,663 B2* | 9/2012 | Jayadevan et al. | 709/228 |
| 8,463,910 B2* | 6/2013 | Hatasaki et al. | 709/226 |
| 8,654,680 B2* | 2/2014 | Subramanian et al. | 370/255 |
| 2001/0003192 A1* | 6/2001 | Ramsay et al. | 709/245 |
| 2002/0124108 A1* | 9/2002 | Terrell et al. | 709/245 |
| 2004/0030787 A1* | 2/2004 | Jandel et al. | 709/229 |
| 2004/0083299 A1* | 4/2004 | Dietz et al. | 709/230 |
| 2004/0093317 A1* | 5/2004 | Swan | 707/1 |
| 2004/0179508 A1* | 9/2004 | Thubert et al. | 370/349 |
| 2004/0243727 A1* | 12/2004 | Chung | 710/1 |
| 2004/0259531 A1* | 12/2004 | Wood et al. | 455/412.1 |
| 2005/0021702 A1* | 1/2005 | Rangarajan et al. | 709/223 |
| 2005/0071472 A1* | 3/2005 | Arndt et al. | 709/226 |
| 2005/0073982 A1* | 4/2005 | Corneille et al. | 370/338 |
| 2005/0078681 A1* | 4/2005 | Sanuki et al. | 370/395.5 |
| 2005/0080920 A1* | 4/2005 | Bender et al. | 709/236 |
| 2005/0086264 A1* | 4/2005 | Masuda | 707/104.1 |
| 2005/0086462 A1* | 4/2005 | Vorbach | 713/100 |
| 2005/0129040 A1* | 6/2005 | Kiel et al. | 370/412 |
| 2005/0138242 A1* | 6/2005 | Pope et al. | 710/48 |
| 2006/0077971 A1* | 4/2006 | Fowler | 370/352 |
| 2006/0114899 A1* | 6/2006 | Toumura et al. | 370/389 |
| 2006/0187922 A1* | 8/2006 | Sumiyoshi et al. | 370/389 |
| 2006/0212537 A1* | 9/2006 | Hans et al. | 709/217 |
| 2007/0133041 A1* | 6/2007 | Tredoux et al. | 358/1.15 |
| 2007/0203943 A1* | 8/2007 | Adlung et al. | 707/104.1 |
| 2007/0232323 A1* | 10/2007 | Spriestersbach | 455/456.1 |
| 2008/0005432 A1* | 1/2008 | Kagawa | 710/106 |
| 2008/0040322 A1* | 2/2008 | Rucker et al. | 707/3 |
| 2008/0059607 A1* | 3/2008 | Schneider | 709/218 |
| 2008/0183893 A1* | 7/2008 | Boden | 709/245 |
| 2008/0215524 A1* | 9/2008 | Fuchs et al. | 707/1 |
| 2008/0298274 A1* | 12/2008 | Takashige et al. | 370/254 |
| 2009/0300066 A1* | 12/2009 | Guo et al. | 707/104.1 |
| 2010/0023582 A1* | 1/2010 | Pedersen et al. | 709/203 |
| 2010/0046517 A1* | 2/2010 | Chida | 370/392 |
| 2010/0049861 A1* | 2/2010 | Cleghorn et al. | 709/230 |
| 2010/0054260 A1* | 3/2010 | Pandey et al. | 370/395.53 |
| 2010/0128605 A1* | 5/2010 | Chavan et al. | 370/230.1 |
| 2010/0185868 A1* | 7/2010 | Grecia | 713/176 |
| 2010/0217847 A1* | 8/2010 | Cook et al. | 709/222 |
| 2010/0237984 A1* | 9/2010 | Zenaty | 340/5.2 |
| 2010/0267368 A1* | 10/2010 | Masputra | 455/414.1 |
| 2010/0306829 A1* | 12/2010 | Nishio | 726/4 |
| 2011/0058573 A1* | 3/2011 | Balakavi et al. | 370/463 |
| 2011/0107156 A1* | 5/2011 | Miyata et al. | 714/49 |
| 2011/0141512 A1* | 6/2011 | Coleman et al. | 358/1.15 |
| 2011/0225226 A1* | 9/2011 | Archer et al. | 709/201 |
| 2011/0225297 A1* | 9/2011 | Archer et al. | 709/225 |
| 2011/0277019 A1* | 11/2011 | Pritchard, Jr. | 726/4 |
| 2011/0320600 A1* | 12/2011 | Froeding et al. | 709/225 |
| 2011/0320759 A1* | 12/2011 | Craddock et al. | 711/206 |
| 2012/0042054 A1* | 2/2012 | Kotha et al. | 709/220 |
| 2012/0042095 A1* | 2/2012 | Kotha et al. | 709/233 |
| 2012/0159552 A1* | 6/2012 | Zhou et al. | 725/51 |
| 2012/0185846 A1* | 7/2012 | Recio et al. | 718/1 |

* cited by examiner

METHOD AND SYSTEM FOR APPLICATION ISOLATION

TECHNICAL FIELD

The present invention relates to computing systems.

BACKGROUND

A computer network, often simply referred to as a network, is a group of interconnected computers and devices that facilitates communication among users and allows users to share resources. Adapters are typically used during network communication. Continuous efforts are being made to improve network communication.

SUMMARY

The various embodiments of the present system and methods have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description" one will understand how the features of the present embodiments provide various advantages.

In one embodiment, a machine implemented method is provided. The method includes receiving a request having an address and a unique identifier from an application from among a plurality of processor-executable applications; comparing the retrieved address and the unique identifier with information maintained by a data structure associating unique identifiers assigned to a plurality of constructs with unique addresses assigned to the plurality of application; and processing the request if the retrieved address and the unique identifier matches the information maintained by the data structure.

In another embodiment, a machine implemented method is provided. The method includes assigning an address to each of a plurality of processor executable applications; assigning a unique identifier to each construct generated by the plurality of applications; maintaining a data structure associating the address with the unique identifier assigned to each construct; receiving a request having an address and a unique identifier from an application from among the plurality of applications; retrieving the address and the unique identifier from the request; comparing the retrieved address and the unique identifier with information maintained by the data structure; and processing the request if the retrieved address and the unique identifier matches with information of the data structure.

In yet another embodiment, a system is provided. The system includes a computing system executing a plurality of applications, where each application is assigned an address by an adapter operationally coupled to the computing system. The adapter assigns a unique identifier to each construct generated by the plurality of applications; maintains a data structure associating the address with the unique identifier assigned to each construct; receives a request having an address and a unique identifier from an application from among the plurality of applications; retrieves the address and the unique identifier from the request; compares the retrieved address and the unique identifier with information maintained by the data structure; and processes the request if the retrieved address and the unique identifier matches with information of the data structure.

This brief summary has been provided so that the nature of the disclosure may be understood quickly. A more complete understanding of the disclosure can be obtained by reference to the following detailed description of the embodiments thereof concerning the attached drawings.

BRIEF DESCRIPTION OF THE DRAWINGS

The various present embodiments relating to selectable initialization for adapters now will be discussed in detail with an emphasis on highlighting the advantageous features. These novel and non-obvious embodiments are depicted in the accompanying drawings, which are for illustrative purposes only. These drawings include the following figures, in which like numerals indicate like parts.

DETAILED DESCRIPTION

Figure 1A:
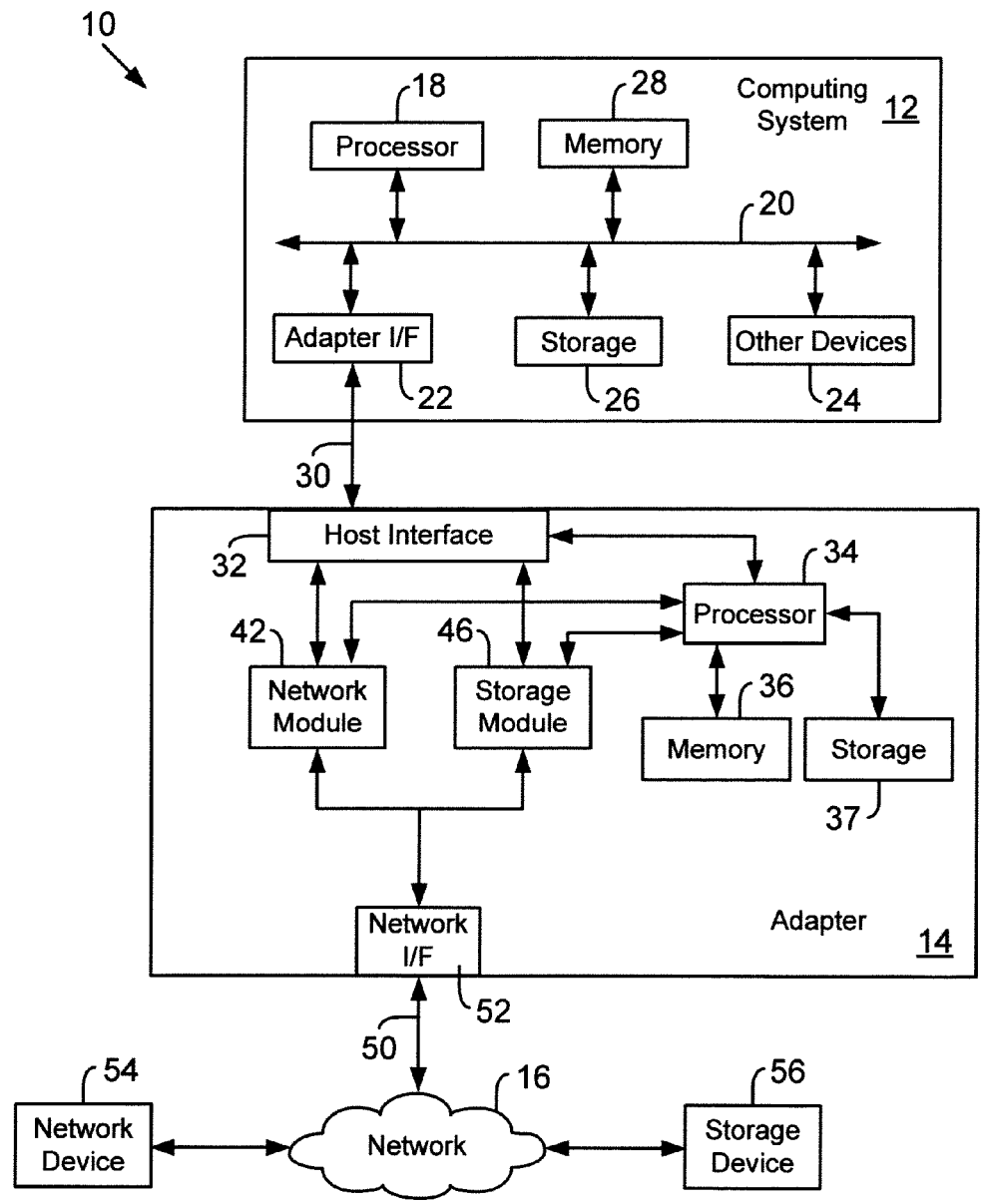
FIG. 1A is a functional block diagram of a computing system coupled to a network through an adapter, used according to one embodiment.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic", "module", "component", "system", and "functionality", as used herein, generally represent software, firmware, hardware, or a combination of these elements. For instance, in the case of a software implementation, the terms "logic", "module", "component", "system", and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of medium for retaining information in any form, including various kinds of storage devices (magnetic, optical, static, etc.). Machine-readable media also encompasses transitory forms for representing information, including various hardwired and/or wireless links for transmitting the information from one point to another.

The embodiments disclosed herein, may be implemented as a computer process (method), a computing system, or as an article of manufacture, such as a computer program product or computer-readable media. The computer program product may be computer storage media, readable by a computer device, and encoding a computer program of instructions for executing a computer process. The computer program product may also be a propagated signal on a carrier, readable by a computing system, and encoding a computer program of instructions for executing a computer process.

FIG. 1A is a block diagram of a system 10 configured for use with the present embodiments. System 10 includes a computing system 12 (may also be referred to as "host system 12") coupled to an adapter 14 that interfaces with a network 16. The network 16 may include, for example, additional computing systems, servers, storage systems and other devices. The computing system 12 may include one or more processors 18, also known as a central processing unit (CPU). The processor 18 executes computer-executable process steps and interfaces with an interconnect 20, may also be referred to as a computer bus 20. The computer bus 20 may be, for example, a system bus, a Peripheral Component Interconnect (PCI) bus (or PCI Express bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other kind of bus.

An adapter interface 22 facilitates the ability of the computing system 12 to interface with the adapter 14, as described below. The computing system 12 also includes other devices and interfaces 24, which may include a display device interface, a keyboard interface, a pointing device interface, etc. The details of these components are not germane to the inventive embodiments.

The computing system 12 may further include a storage device 26, which may be for example a hard disk, a CD-ROM, a non-volatile memory device (flash or memory stick) or any other device. Storage 26 may store operating system program files, application program files, and other files. Some of these files are stored on storage 26 using an installation program. For example, the processor 18 may execute computer-executable process steps of an installation program so that the processor 18 can properly execute the application program.

Memory 28 also interfaces to the computer bus 20 to provide the processor 18 with access to memory storage. Memory 28 may include random access main memory (RAM). When executing stored computer-executable process steps from storage 26, the processor 18 may store and execute the process steps out of RAM. Read only memory (ROM, not shown) may also be used to store invariant instruction sequences, such as start-up instruction sequences or basic input/output system (BIOS) sequences for operation of a keyboard (not shown).

With continued reference to FIG. 1A, a link 30 and the adapter interface 22 couple the adapter 14 to the computing system 12. The adapter 14 may be configured to handle both network and storage traffic. Various network and storage protocols may be used to handle network and storage traffic, for example, Ethernet, Fibre Channel, Fibre Channel over Ethernet, InfiniBand, Remote Direct Memory Access (RDMA), iSCSI and others.

The adapter 14 interfaces with the computing system 12 via the link 30 and a host interface 32. In one embodiment, the host interface 32 may be a Peripheral Component Interconnect (PCI) Express interface coupled to a PCI Express link (for example, link 30). The adapter 14 may also include a processor that executes firmware instructions out of memory 36 to control overall adapter 14 operations. Memory 36 may also include the process steps, according to one embodiment.

The adapter 14 may also include storage 37, which may be for example non-volatile memory, such as flash memory, or any other device. The storage 37 may store executable instructions and operating parameters that can be used for controlling adapter operations.

The adapter 14 includes a network module 42 that interfaces with network 16 via a network interface 52 and link 50 for handling network traffic. In one embodiment, the network interface 42 includes logic and circuitry for handling network packets, for example, Ethernet or any other type of network packets. The network module 42 may include memory buffers (not shown) to temporarily store information received from other network devices 54 and transmitted to other network devices 54.

The adapter 14 may also include a storage module 46 for handling storage traffic to and from storage devices 56. The storage module 46 may further include memory buffers (not shown) to temporarily store information received from the storage devices 56 and transmitted by the adapter 14 to the storage devices 56. In one embodiment, the storage module 46 is configured to process storage traffic according to the Fibre Channel storage protocol, or any other protocol.

The adapter 14 also includes a network interface 52 that interfaces with a link 50 via one or more ports (not shown). The network interface 52 includes logic and circuitry to receive information via the link 52 and pass it to either the network module 42 or the storage module 46.

Figure 1B:
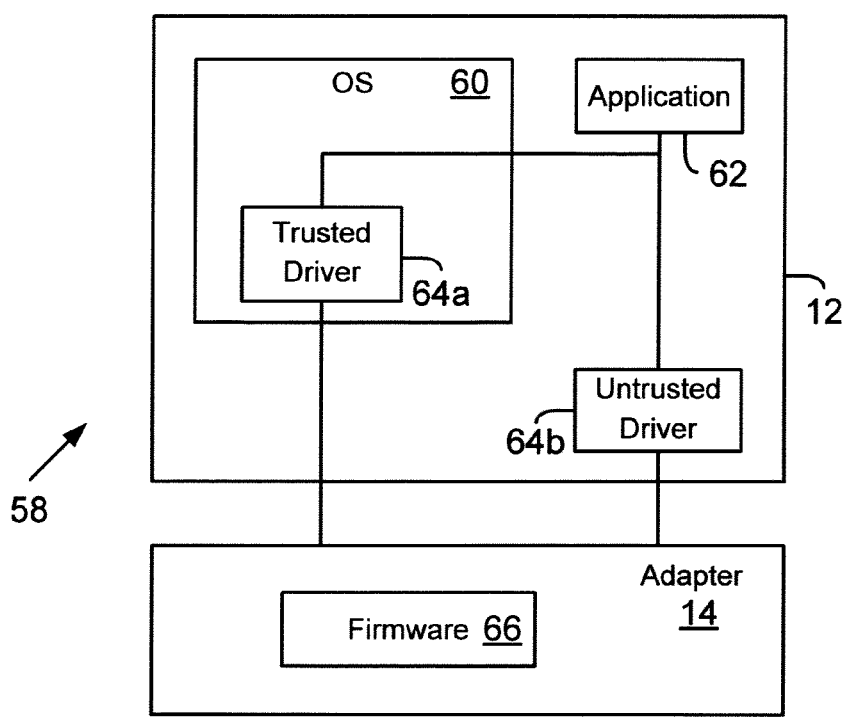
FIG. 1B shows an architecture used by the system of FIG. 1A, according to one embodiment.

FIG. 1B shows an example of an architecture 58 that may be used by system 10, according to one embodiment. Architecture 58 includes an operating system 60 that is executed by computing system 12. Firmware 66 is executed by adapter 14 for controlling the overall functionality of adapter 14. In one embodiment, host system 12 may use two drivers 64a and 64b to interface with firmware 66. Driver 64a may be referred to as a trusted driver executed within an operating system 60 context. Driver 64b may be referred to as an un-trusted driver that is executed in a user space. In one embodiment, the functionality and logic associated with trusted driver 64a cannot be changed by a user, while the functionality and logic of the untrusted driver 64b may be changed by a user.

In one embodiment, an application 62 is executed for performing a task, for example, generating a request for sending information to another device. Application 62 may use the untrusted driver 64b for certain operations for efficiency purposes because application 62 does not have to operate within an operating system 60 context. Application 62 uses the trusted driver 64a for making certain system calls via operating system 60.

In one embodiment, application 62 may initiate an operation request on behalf of a construct. The request may be sent to adapter 14 via the untrusted adapter driver 64b. The term construct as used herein may mean an object or structure that is maintained by computing system 12/adapter 14 (including firmware 66) for performing a certain task. For example, a construct may be maintained for sending or receiving information to/from another device, for arming or disarming interrupts, event notifications and others.

Figure 1C:
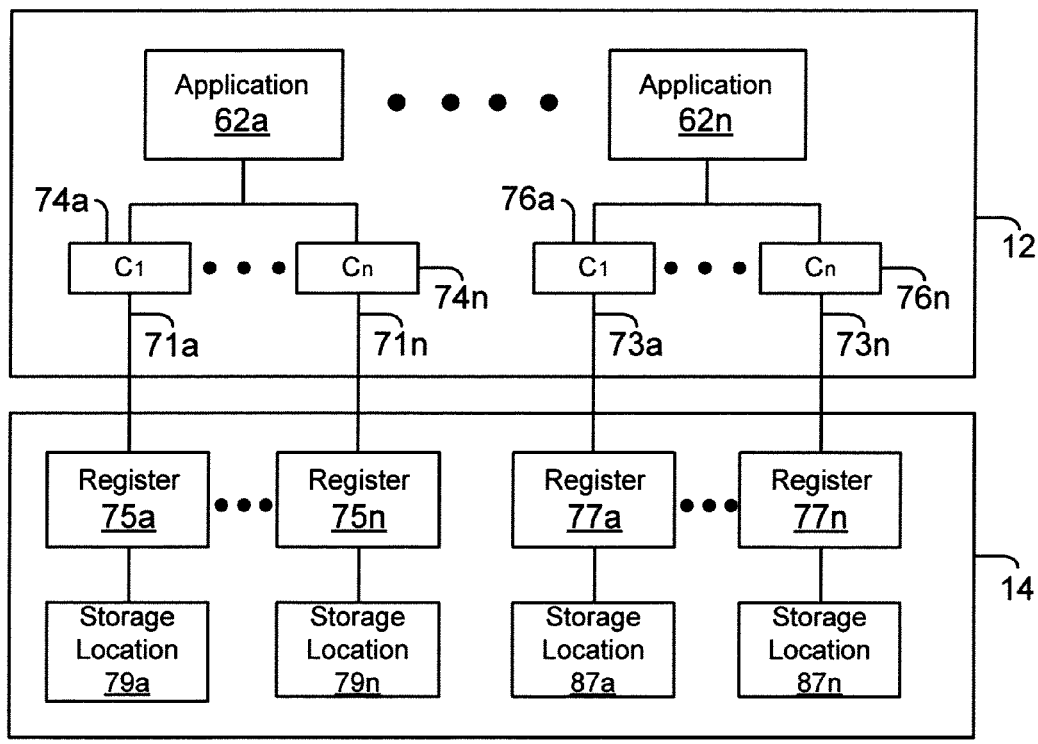
FIG. 1C shows a conventional solution for handling requests.

FIG. 1C shows an example of how these requests are handled by conventional systems. FIG. 1C shows a plurality of applications 62a-62n that are executed by computing system 12. Each application may issue requests for a plurality of constructs (may also be referred to as "connections") 74a-74n and 76a-76n, respectively. For maintaining security, it is desirable that adapter 14 provide isolation between the various requests. This means that application 62a can only submit operations for constructs 74a-74n that it owns, and is not able to submit operations for constructs 76a-76n that it does not own.

Typically, to provide isolation, adapter 14 will have access to a dedicated register 75a-75n and 77a-77n for each construct 74a-74n and 76a-76n (or a dedicated adapter register is assigned to each application 62a-62n). An address 71a-71n and 73a-73n is assigned to each construct 74a-74n and 76a-76n to access the dedicated registers. When a request for a particular construct is sent by an application via link 30 and received by host interface 32, based on the address, the assigned register 75a-75n/77a-77n is accessed and a command is placed at a storage location from among 79a-79n and 87a-87n. Adapter 14 retrieves the command from the storage location and then processes the command.

The use of dedicated registers for each construct or for each application, as shown in FIG. 1C is not desirable because as the number of constructs and/or number of applications increase, one has to increase the number of registers and the associated storage locations 79a-79n/81a-81n. This adds complexity and cost to the overall adapter 14 design. The embodiments disclosed herein provide isolation without using dedicated registers for each application and/or construct, as described below in more detail.

Figure 1E:
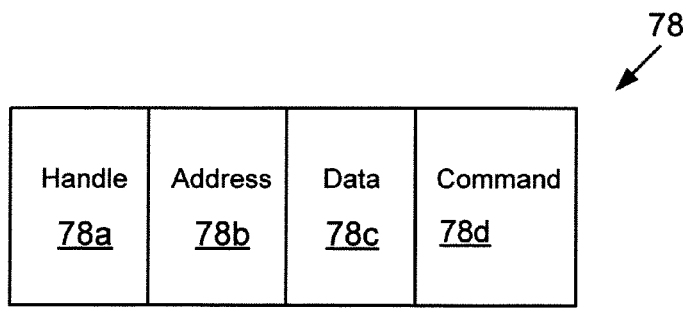
FIG. 1E is an example of an application request, according to one embodiment.
Figure 1D:
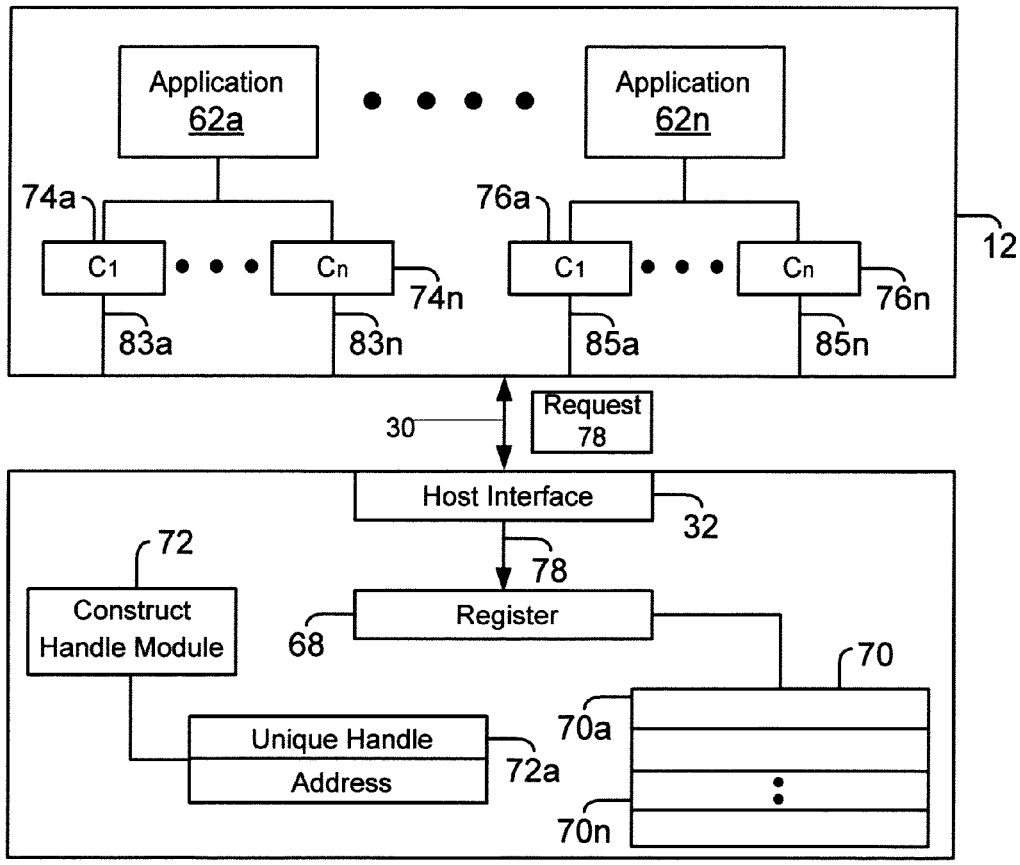
FIG. 1D illustrates a system, according to one embodiment.

FIG. 1D shows an example of a system implemented in adapter 14 for handling requests from applications 62a-62n for the plurality of constructs 74a-74n/76a-76n, according to one embodiment. Instead of dedicated registers, as shown in FIG. 1C, a register 68 is used to receive a request 78 from an application. Register 68 is associated with storage location 70 having a plurality of entries 70a-70n for storing commands that are received from application 62a-62n. Each construct 74a-74n and 76a-76n (or applications 62a-62n) is assigned an interconnect address 83a-83n and 85a-85n, respectively, to access register 68 as described below in detail.

Adapter 14 also includes a processor executable construct handle module 72 (may also be referred to as module 72) for generating a unique handle (or identifier) for each construct 74a-74n/76a-76n. In one embodiment, when applications 62a-62n create the plurality of constructs 74a-74n/76a-76n, then module 72 assigns the unique handle for the construct and provides the unique handle to the application. The unique handle is associated with an interconnect address 83-83n/85a-85n and may be stored as a data structure 72a (may also be referred to as mapping data structure) at a memory location, for example, 36 and/or 37. The data structure 72a is used by adapter 14 to securely process application requests, as described below in more detail.

FIG. 1E shows an example of a request 78 that is sent by an application (for example, 62a) to adapter 14 via link 30 and host interface 32. In one embodiment, request 78 includes a handle 78a that is generated by module 72 for a construct, for example, 74a. The interconnect address 78b for the construct is also included in request 78. Data 78c and a command 78d from the application are also included in request 78. As an example, data 78c may be used to encode handle 78a and the command 78d that the application wants performed. It is noteworthy that request 78 may include other standard headers and information that may not be germane to the inventive embodiments and hence have not been described in detail.

Referring back to FIG. 1D, when request 78 is received, adapter 14 stores it at one of the storage location entries 70a-70n. Subsequently, adapter 14 (for example, processor 34 or any other component of adapter 14) inspects request 78 and identifies data structure 72a using handle 78a. The address in request 78 is then verified against the one saved in data structure 72a. If there is a match, command 78d in request 78 is performed on the construct. If there is no match, then request 78 (and thus command 78d) is ignored. The storage location entry that stores the command is then freed up to temporarily hold other commands.

Figure 2:
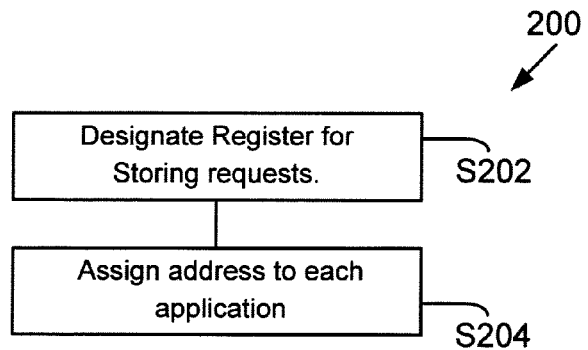
FIGS. 2 and 3 are process flow diagrams, according to one embodiment.

FIG. 2 shows a process flow diagram for configuring module 72 and register 68, according to one embodiment. The process starts in block S202, when register 68 and storage location 70 are assigned to applications 62a-62n. In block S204, in one embodiment, an interconnect address 83a-83n/85a-85n is assigned to each of the plurality of applications 62a-62n. As described above, interconnect addresses 83a-83n/85a-85n may also be assigned to each construct 74a-74n/76a-76n for accessing register 68. In one embodiment, address 83a-83n/85a-85n may be an address range of a certain size, for example, 4096 bytes. The address range size depends on a host processor 12 minimum memory management unit page size.

Figure 3:
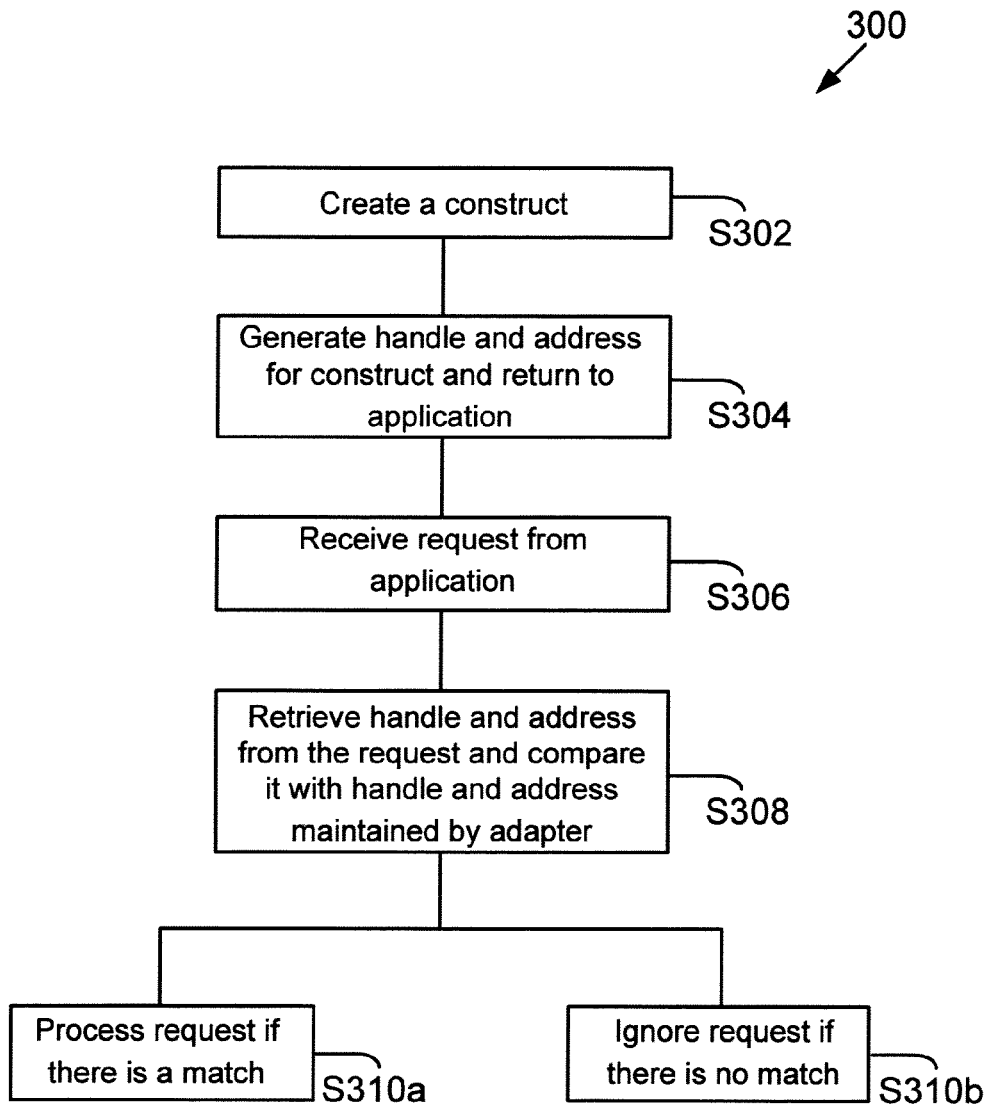

FIG. 3 shows a process 300 for processing a command, according to one embodiment. The process begins in block S302 when a construct is generated by an application, for example application 62a. As mentioned above, the construct may be a network connection for sending and receiving information. In one embodiment, the construct is generated by trusted driver 64a.

In block S304, a unique handle 78a is generated for the construct 74a, and an interconnect address 78b is associated with the construct. The unique handle 78a is generated by module 72 and returned to the application 62a. Adapter 14 maintains the data structure 72a that associates the unique handle 78a with the address 78b at a memory location, according to one embodiment.

In block S306, application 62a sends a request 78 (FIG. 1E) with an address 78b and unique handle 78a to adapter 14. As described above, request 78 also includes a command, for example 78d to perform a task, for example to send information or provide status.

In block S308, adapter 14 retrieves an outstanding command from command storage location 70, for example, entry 70a. Adapter 14 retrieves the unique handle 78a and the address from request 78. The retrieved handle is used to lookup data structure 72a. If the retrieved address and handle match with information stored at mapping data structure 72a, then the command 78d from request 78 is processed in block S310A. If the retrieved handle and address do not match with information at data structure 72a, then the request 78 is ignored in block S310b.

The embodiments disclosed herein allow adapter 14 to isolate requests for different constructs of different applications without having to use dedicated registers for each application. If a malicious application attempts to send a request on behalf of a construct it does not own, adapter 14 ignores the request because the request will not include the appropriate unique handle and the assigned address that is maintained by adapter 14.

Although the present disclosure has been described with reference to specific embodiments, these embodiments are illustrative only and not limiting. Many other applications and embodiments of the present invention will be apparent in light of this disclosure and the following claims. References throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

What is claimed is:

1. A machine implemented method for processing requests from a plurality of processor-executable applications executed by a computing system coupled to a network device used for communicating with another device, comprising:

the network device assigning an address to each of the plurality of applications to access a register that is associated with a storage device used for storing a plurality of commands for the plurality of applications;

the network device assigning a unique identifier to each construct generated by each of the plurality of applications for sending information to the another device;

maintaining a data structure at the network device for associating the address assigned to each of the plurality of applications with the unique identifier assigned to each construct;

the network device receiving a request having an address and a unique identifier from an application from among the plurality of applications;

the network device retrieving the address and the unique identifier from the request;

the network device comparing the retrieved address and the unique identifier with information maintained by the data structure; and the network device processing the request when the retrieved address and the unique identifier matches with information of the data structure.

2. The method of claim 1, wherein the network device is a network adapter that assigns the address to each of the plurality of applications and the unique identifier to each of the plurality of constructs.

3. The method of claim 1, wherein the assigned address is to access a register that is used by the plurality of applications for sending requests.

4. The method of claim 1, wherein the network device is a network adapter for processing storage traffic complying with a storage protocol and network traffic complying with a network protocol.

5. The method of claim 1, wherein the network device is an adapter configured to process information complying with a storage protocol.

6. The method of claim 3, wherein the register is used by a plurality of constructs and is associated with another storage location for storing commands from the plurality of applications.

7. The method of claim 1, wherein the data structure is stored at a memory device of the network device.

8. A machine implemented method, comprising:

a device interfacing with a computing system for receiving a request having an address for a storage location and a unique identifier assigned by the device to an application from among a plurality of processor executable applications executed by the computing system;

the device comparing the received address and the unique identifier with information maintained by a data structure at the device for associating unique identifiers assigned to a plurality of constructs with unique addresses assigned to the plurality of applications; and the device processing the request when the received address and the unique identifier matches the information maintained by the data structure.

9. The method of claim 8, wherein the device is a network adapter that assigns the address to each of the plurality of applications and the unique identifier to each of the plurality of constructs.

10. The method of claim 8, wherein the storage location is a register that is used by the plurality of applications for sending requests.

11. The method of claim 8, wherein the device is a network adapter for processing storage traffic complying with a storage protocol and network traffic complying with a network protocol.

12. The method of claim 8, wherein the device is an adapter configured to process information complying with a storage protocol.

13. The method of claim 10, wherein the register is used by a plurality of constructs and is associated with another storage location for storing commands from the plurality of applications.

14. A system, comprising:

a computing system having a processor for executing a plurality of applications, where each application is assigned an address by an adapter operationally coupled to the computing system to access a register that is associated with a storage device used for storing a plurality of commands for the plurality of applications;

wherein the adapter having a processor assigns a unique identifier to each construct generated by each of the plurality of applications for sending information to another device; maintains a data structure associating the address assigned to each application with the unique identifier assigned to each construct; receives a request having an address and a unique identifier from an application from among the plurality of applications; retrieves the address and the unique identifier from the request; compares the retrieved address and the unique identifier with information maintained by the data structure; and processes the request when the retrieved address and the unique identifier matches with information of the data structure.

15. The system of claim 14, wherein the assigned address is to access a register that is used by the plurality of applications for sending requests.

16. The system of claim 14, wherein the adapter is configured for processing both network and storage traffic.

17. The system of claim 14, wherein the adapter is network interface card.

18. The system of claim 14, wherein the adapter includes a module for maintaining the data structure and assigning the unique handle.

19. The system of claim 15, wherein the register is used by a plurality of constructs and is associated with another storage location for storing commands from the plurality of applications.

20. The system of claim 14, wherein the data structure is stored at a memory device of the adapter.

* * * * *

UNITED STATES PATENT AND TRADEMARK OFFICE
CERTIFICATE OF CORRECTION

PATENT NO. : 8,880,732 B1
APPLICATION NO. : 13/035114
DATED : November 4, 2014
INVENTOR(S) : Kanoj Sarcar Page 1 of 1

It is certified that error appears in the above-identified patent and that said Letters Patent is hereby corrected as shown below:

In the Specification,

In column 3, line 67, delete "processor" and insert -- processor 34 --, therefor.

Signed and Sealed this
Twenty-fourth Day of March, 2015

Michelle K. Lee
*Director of the United States Patent and Trademark Office*